(12) United States Patent
Salit et al.

(10) Patent No.: US 8,432,551 B2
(45) Date of Patent: Apr. 30, 2013

(54) NEON OR IODINE ABSORPTION ENHANCED HENE RING LASER GYROSCOPE

(75) Inventors: Kenneth Salit, Plymouth, MN (US); Mary Salit, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 400 days.

(21) Appl. No.: 12/851,856

(22) Filed: Aug. 6, 2010

(65) Prior Publication Data

US 2012/0033225 A1  Feb. 9, 2012

(51) Int. Cl.
*G01C 19/66* (2006.01)
(52) U.S. Cl.
USPC ........................................................... 356/469
(58) Field of Classification Search .................. 356/459, 356/469, 471, 472
See application file for complete search history.

(56) References Cited

U.S. PATENT DOCUMENTS

| 4,481,635 | A | * | 11/1984 | Broberg et al. ................. 372/94 |
| 4,632,555 | A | | 12/1986 | Malvern |
| 4,718,766 | A | * | 1/1988 | Greenstein .................... 356/472 |
| 4,815,851 | A | | 3/1989 | Soohoo |
| 4,955,034 | A | * | 9/1990 | Scerbak ......................... 372/94 |
| 5,166,949 | A | | 11/1992 | Perlmutter |
| 6,856,716 | B2 | | 2/2005 | Mukai |
| 7,058,111 | B2 | | 6/2006 | Seiber |
| 7,085,304 | B2 | | 8/2006 | Vetrovec |
| 7,149,231 | B2 | | 12/2006 | Afzal et al. |
| 7,804,600 | B1 | | 9/2010 | Smith |
| 2001/0036011 | A1 | | 11/2001 | Galstain |
| 2003/0123784 | A1 | | 7/2003 | Mukai |
| 2004/0066805 | A1 | | 4/2004 | Afzal et al. |
| 2006/0029112 | A1 | | 2/2006 | Young et al. |
| 2007/0071059 | A1 | | 3/2007 | Afzal et al. |
| 2007/0189350 | A1 | | 8/2007 | Young et al. |
| 2009/0116520 | A1 | | 5/2009 | Oozeki |
| 2009/0232172 | A1 | | 9/2009 | Masuda et al. |
| 2010/0014091 | A1 | | 1/2010 | Strabley |
| 2011/0249268 | A1 | | 10/2011 | Salit et al. |

OTHER PUBLICATIONS

Apruzese et al., "Some Effects of Radiative and Collisional Broadening on Line Emission in a Spherical, Laser-Heated Plasma", "Journal of Quantitative Spectroscopy and Radiative Transfer", Sep. 10, 1976, pp. 557-562, vol. 17, No. 5.
Aronowitz, "Fundamentals of the Ring Laser Gyro", "http://ftp.rta.nato.int/Public/PubFullText/RTO/AG/RTO-AG-339/$AG-339-03.PDF", Apr. 28, 2000, pp. 3-1 thru 3-45, Publisher: NATO Research and Technology Organisation.

(Continued)

*Primary Examiner* — Michael A Lyons
(74) *Attorney, Agent, or Firm* — Fogg & Powers LLC

(57) ABSTRACT

One embodiment of a ring laser gyroscope discussed herein includes a cavity containing a gain medium having a first linewidth, a first plurality of reflective surfaces coupled to the cavity, and at least one medium exciter operable to excite the gain medium. The first plurality of reflective surfaces includes at least first, second, and third reflective surfaces. The first, second, and third reflective surfaces are positioned to reflect light along a path defined in the cavity between the plurality of reflective surfaces. The excited gain medium induces first and second laser fields within the cavity. A portion of the cavity contains an absorption medium having a second linewidth that is narrower than the first linewidth of the gain medium. The absorption medium reduces the gain of the first and second laser fields at a first range of frequencies.

20 Claims, 8 Drawing Sheets

OTHER PUBLICATIONS

Faxvog et al., "Pulse Velocity and Mode Pulling in a Laser With Equally Spaced Modes", "Journal of Applied Physics", Dec. 1, 1969, pp. 2457-2458, vol. 41, No. 6, Publisher: American Institute of Physics.

Faxvog et al., "Measured Pulse Velocity Greater Than c in a Neon Absorption Cell", "Applied Physics Letters", Jun. 1, 1970, pp. 192-193, vol. 17, No. 5.

"The Frazier Model 100 Iodine Stabilized Helium Neon Laser System", "http://frazierinstrument.com/products/fisl/fisl.html", Accessed: Jun. 4, 2010, Publisher: Frazier Precision Instrument Company, Inc.

"Iodine Stabilized Helium-Neon Laser", "http://museum.nist.gov/object.asp?ObjID=50", Accessed: Jun. 4, 2010, Publisher: National Institute of Standards and Technology.

Karapetyan, "Advanced Configuration of Gravitational-Wave Interferometer on the Base of 'Sensitive Mode' in 'White-Light Cavity'", "Optics Communications 219 (2003)", 2003, pp. 335-340, Publisher: Elsevier Science B.V.

Pati et al., "Demonstration of Displacement-Measurement-Sensitivity Proportional to Inverse Group Index of Intra-Cavity Medium in a Ri", "Optics Communications 281 (2008)", pp. 4931-4935, Publisher: Elsevier B.V.

Pati et al., "Simultaneous Slow and Fast Light Effects Using Probe Gain and Pump Depletion Via Raman Gain in Atomic Vapor", 2008, Publisher: Optical Society of America.

Pati et al., "Demonstration of a Tunable-Bandwidth White Light Interferometer using Anomalous Dispersion in Atomic Vapor", Sep. 2, 2007, Publisher: Northwestern University.

Pati et al., "Simultaneous Generation of Slow and Fast Light for Raman Coupled Beams", "Advances in Slow and Fast Light", 2008, pp. 69040L-1 thru 69040L-7, vol. 6904, Publisher: SPIE.

Rinkleff et al., "The Concept of White Light Cavities Using Atomic Phase Coherence", "Physica Scripta", 2005, pp. 85-88, vol. T118, Publisher: Physica Scripta.

Salit et al., "Fast-Light for Astrophysics: Super-Sensitive Gyroscopes and Gravitational Wave Detectors", "Journal of Modern Optics", Nov. 10-20, 2007, pp. 2425-2440, vol. 54, No. 16-17, Publisher: Taylor & Francis.

Shahriar et al., "Ultrahigh Enhancement in Absolute and Relative Rotation Sensing Using Fast and Slow Light", "Available at http://arxiv.org/ftp/quant-ph/papers/0505/0505192.pdf accessed Aug. 5, 2010", Jul. 17, 2005, Publisher: The American Physical Society.

Shahriar et al., "Ultrahigh Precision Absolute and Relative Rotation Sensing Using Fast and Slow Light", "Quantum Information Technology", Oct. 23, 2002, Publisher: MIT.

Shahriar et al., "Application of Fast-Light in Gravitational Wave Detection with Interferometers and Resonators", "Journal of Modern Optics", Nov. 10-20, 2008, pp. 3133-3147, vol. 55, No. 19-20, Publisher: Taylor & Francis.

Shahriar et al., "Ultrahigh Precision Absolute and Relative Rotation Sensing using Slow and Fast Light", "Quantum Information Technology http://www.rle.mit.edu/quantummuri/publications/Additions4_05/Shahriar_8.pdf accessed Aug. 5, 2010", 2005, Publisher: Northwestern University.

Smith et al., "Dispersion-enhanced Laser Gyroscope", "available at http://ntrs.nasa.gov/archive/nasa/casi.ntrs.nasa.gov/20090019025_2009016480.pdf accessed Aug. 5, 2010", Jun. 16, 2008, Publisher: NASA.

Smith et al., "Dispersion-ehanced laser gyroscope", "Physical Review A", 2008, pp. 053824-1 thru 053824-9, vol. 78, No. 053824, Publisher: The American Physical Society.

Tripathi et al., "Experimental Constraints of Using Slow-Light in Sodium Vapor for Light-Drag Enhanced Relative Rotation Sensing", "Optics Communications", Oct. 15, 2006, pp. 604-608, vol. 266, No. 2, Publisher: Elsevier B.V.

Salit et al., "U.S. Appl. No. 12/755,623: Enhanced Ring Laser Gyroscope With Dispersion Controlled Gain Condition", Filing Date: Apr. 7, 2010.

Wicht et al., "White-Light Cavities, Atomic Phase Coherence, and Gravitational Wave Detectors", "Optics Communications", Jan. 15, 1997, pp. 431-439, vol. 134, Publisher: Elsevier Science B.V.

Wise et al., "Linewidth-Broadened Fabry-Perot Cavities within Future Gravitational Wave Detectors", "Classical and Quantum Gravity", 2004, pp. S1031-S1036, vol. 21, Publisher: Institute of Physics Publishing.

Yum et al., "Fast-Light in a Photorefractive Crystal for Gravitational Wave Detection", "Optics Express", Dec. 8, 2008, pp. 20448-20456, vol. 16, No. 25, Publisher: Optical Society of America.

Pati et al., "Simultaneous Slow and Fast Light Effects Using Probe Gain and Pump Depletion Via Raman Gain in Atomic Vapor", 2008, pp. 1-6, Publisher: Optical Society of America.

Phillips, "Spatially-Resolved Temperature Diagnostic for Supersonic Flow Using Cross-Beam Doppler-Limited Laser Saturation Spectros", Mar. 2006, pp. 1-185, Publisher: Air Force Institute of Technology, Published in: Wright-Patterson Air Force Base, Ohio.

Rabeendran, "A Study of Ring Laser Gyroscopes", 2008, p. i-88, Publisher: University of Canterbury.

Salit, "Intracavity Fast Light for Rotation Sensing and Gravitational Wave Detection", Jun. 2009, pp. 1-221, Publisher: ProQuest LLC.

Shahriar et al., "Ultrahigh Precision Absolute and Relative Rotation Sensing using Slow and Fast Light", "Quantum Information Technology http://www.rle.mit.edu/quantummuri/publications/Additions4_05/Shahriar_8.pdf accessed Aug. 5, 2010", 2005, pp. 1-5, Publisher: Northwestern University.

Slagmolen, "Phase-Sensitive Reflection Technique for Characterization of a Fabry-Perot Interferometer", "Applied Optics", Jul. 20, 2000, pp. 3638-3643, vol. 39, No. 21, Publisher: Optical Society of America.

Smith et al., "Dispersion-enhanced laser gyroscope", "Physical Review A", 2008, pp. 053824-1 thru 053824-9, vol. 78, No. 053824, Publisher: The American Physical Society.

Terrel, "Ring-Coupled Mach-Zehnder Interferometer Optimized for Sensing", "Applied Optics", Sep. 1, 2009, pp. 4874-4879, vol. 48, No. 26, Publisher: Optical Society of America.

Terrel, "Coupled Resonator Gyroscopes: What Works and What Does Not", "Advances in Slow and Fast Light III", Jun. 24, 2010, pp. 1-9, vol. 7612, Publisher: SPIE.

Shariar et al., "Ultrahigh Precision Absolute and Relative Rotation Sensing using Fast and Slow Light, Version 1", "Available at http://arxiv.org/pdf/quant-ph/0505192v1", May 2005, pp. 1-6, Publisher: arXiv.org.

Shariar et al., "Ultrahigh Precision Absolute and Relative Rotation Sensing using Fast and Slow Light, Version 2", "Available at http://arxiv.org/pdf/quant-ph/0505192v2", Jul. 2005, pp. 1-11, Publisher: arXiv.org.

Shariar et al., "Ultrahigh Precision Absolute and Relative Rotation Sensing using Fast and Slow Light, Version 3", "Available at http://arxiv.org/pdf/quant-ph/0505192v3", Oct. 2006, pp. 1-24, Publisher: arXiv.org.

Shariar et al.,, "Ultrahigh Precision Absolute and Relative Rotation Sensing using Fast and Slow Light, Version 4", "Available at http://arxiv.org/pdf/quant-ph/0505192v4", Feb. 2007, pp. 1-28, Publisher: arXiv.org.

Shariar et al., "Ultrahigh Precision Absolute and Relative Rotation Sensing using Fast and Slow Light, Version 5", "Available at http://arxiv.org/pdf/quant-ph/0505192v5", Mar. 2007, pp. 1-28, Publisher: arXiv.org.

* cited by examiner

NEON OR IODINE ABSORPTION ENHANCED HENE RING LASER GYROSCOPE

CROSS-REFERENCE TO RELATED APPLICATIONS

The present application is related to commonly assigned and co-pending U.S. patent application Ser. No. 12/173,777 (hereafter "the '777 application") entitled "AN ENHANCED SCALE FACTOR RING LASER GYROSCOPE", filed on Jul. 15, 2008. The present application is also related to commonly assigned and co-pending U.S. patent application Ser. No. 12/755,623 (hereafter "the '623 application") entitled "ENHANCED RING LASER GYROSCOPE WITH DISPERSION CONTROLLED GAIN CONDITION", filed on Apr. 7, 2010. The '777 application and the '623 application are both incorporated herein by reference in their entirety.

BACKGROUND

Ring laser gyroscopes are navigation instruments used to measure rotation rates about an axis of rotation. A ring laser gyroscope typically includes a closed cavity and at least three mirrors designed to reflect light in a loop. Light travels through the closed cavity in both a clock-wise ("CW") and a counter clock-wise ("CCW") direction. When the ring laser gyroscope is stationary, a beam of light traveling through the cavity in the CW direction has the same frequency as a beam of light traveling through the cavity in the CCW direction.

When the ring laser gyroscope is rotating, the frequency of the CW beam is different than that of the CCW beam. Utilizing the Sagnac effect, the frequency difference between a first beam traveling in the CW direction and a second beam traveling in the CCW direction is calculated. This is called resonant frequency splitting.

The rotation rate of the gyroscope is proportional to the frequency difference between the CW beam and the CCW beam. The constant of proportionality between the resonant frequency splitting and the rotation rate is the scale factor. The scale factor is a scaling constant that determines the amplitude of the difference signal generated at a given rotation rate. The scale factor is normally proportional to the area of the device, so that a tradeoff exists between size and performance. The performance of a ring laser gyroscope depends on its scale factor.

SUMMARY

One embodiment of a ring laser gyroscope discussed herein includes a cavity containing a gain medium having a first linewidth, a first plurality of reflective surfaces coupled to the cavity, and at least one medium exciter operable to excite the gain medium. The first plurality of reflective surfaces includes at least a first reflective surface, a second reflective surface, and a third reflective surface. The first, second, and third reflective surfaces are positioned to reflect light along a path defined in the cavity between the plurality of reflective surfaces. The excited gain medium induces first and second laser fields within the cavity. A portion of the cavity contains an absorption medium having a second linewidth that is narrower than the first linewidth of the gain medium. The absorption medium absorbs some of the first and second laser fields, reducing the gain of the first and second laser fields at a first range of frequencies.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
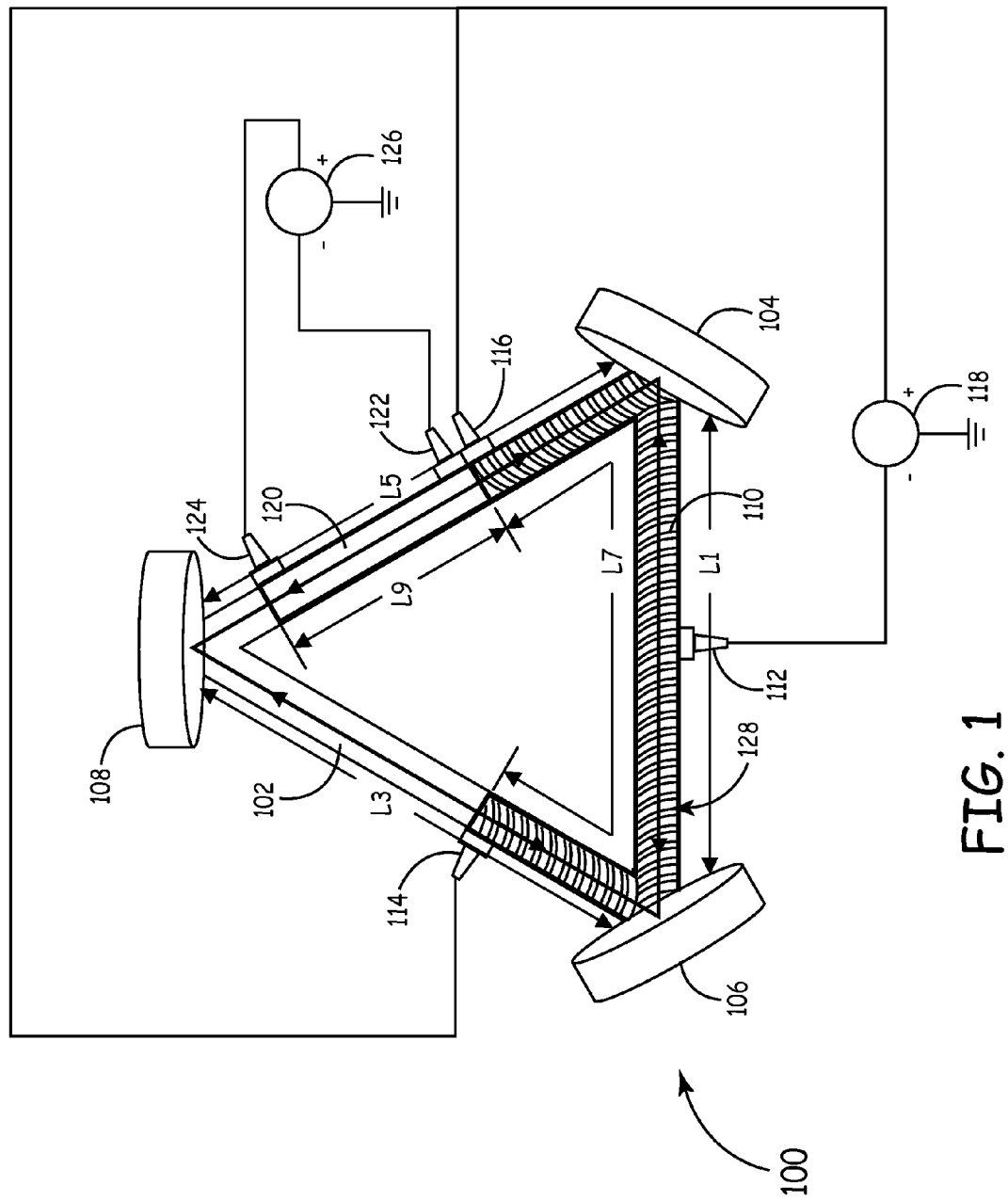
FIG. 1 is a block diagram depicting an exemplary embodiment of a fast light ring laser gyroscope having an enhanced scale factor.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and in the specification is not to be construed as limiting the order in which the individual steps may be performed. The following detailed description is, therefore, not to be taken in a limiting sense.

The ring laser gyroscopes described herein increase the scale factor without increasing the area of the device through fast light dispersion. In example gyroscopes described below, an additional frequency dependent phase shift is introduced within a laser cavity. This phase shift can be introduced by any dispersive element under certain conditions. One of these conditions is that the total round trip optical phase in the cavity varies with optical frequency significantly less than would be the case in free space, with the scale factor enhancement increasing as the derivative of phase with respect to frequency approaches zero. This condition is met by some types of anomalous dispersion. Thus, the fast light laser gyroscopes described herein leverage anomalous dispersion to increase the scale factor. While this specification generally describes using a laser operating in a continuous wave mode, in other example embodiments other modes of operation can be used.

Increasing the scale factor using fast light dispersion allows for miniaturization of navigation grade gyros, enabling a potential cost reduction as well. Increasing the scale factor also reduces the "dead band" in conventional ring laser gyroscopes. This reduction in "dead band" may eliminate the need for a dither motor with associated savings in production costs and reduction in noise. The increase in scale factor without respect to area of the ring laser gyroscope allows the use of ring laser gyroscopes in applications requiring small devices.

FIG. 1 is a block diagram depicting an exemplary fast light ring laser gyroscope 100 having an enhanced scale factor. The gyroscope 100 includes an interior cavity 102 filed with a helium-neon ("HeNe") gas. While a HeNe gas is described in this embodiment, other gases can be used in other embodiments. The interior cavity 102 forms an equilateral triangle. A first mirror 104 is positioned at a first corner of the triangle. A second mirror 106 is positioned at a second corner of the triangle. A third mirror 108 is positioned at a third corner of the triangle. The length of the cavity 102 between mirror 104 and mirror 106 is L1. The length of the cavity 102 between mirror 106 and mirror 108 is L3. The length of the cavity 102 between mirror 108 and mirror 104 is L5. In other embodiments, the interior cavity 102 forms other shapes and/or greater or fewer mirrors are used in the gyroscope 100. While mirrors are described in this embodiment, other embodiments may use other reflective surfaces. In other example embodiments, reflective structures such as Bragg gratings, photonic crystals, etc. may be employed, but the dispersion inherent in such wavelength-dependent reflectors will also impact the overall dispersion present in the gyroscope and should be taken into account.

A portion of HeNe gas in the cavity 102 of length L7 is converted into a gain medium 110 by exciting the helium and neon atoms. The gain medium 110 in gyroscope 100 fills all of the cavity 102 between mirror 104 and mirror 106 in addition to portions of the cavity 102 between mirror 106 and mirror 108 and portions of the cavity 102 between mirror 104 and mirror 108. While length L7 spans the entire length L1 and portions of length L3 and L5 in the example embodiment, it can be shorter or longer in other embodiments. The helium and neon atoms are excited by inducing a current across the length L7. The current is induced using electrode 112, electrode 114, and electrode 116 powered by a power source 118. The power source 118 applies a current between electrode 112 and electrode 114 and electrode 116. In one non-limiting exemplary embodiment, electrode 112 is a cathode, electrode 114 is an anode, and electrode 116 is an anode. In other embodiments, different amounts of either cathodes, anodes, or both are included. The portion of the HeNe gas is thus excited into the gain medium 110 using a medium exciter including electrode 112, electrode 114, and electrode 116. The excited helium atoms collide with the neon atoms which produce fluorescence and stimulated emission.

The gain medium 110 induces light that propagates in both the CW and CCW directions through the cavity 102 of the gyroscope 100 along a path defined in the cavity between mirror 104, mirror 106, and mirror 108. The light propagating through the cavity 102 of the gyroscope 100 constructively interferes with itself to create two counter rotating beams, one traveling in the CW direction and the other traveling in the CCW direction, both with a wavelength of approximately 633 nanometers, in this example, while the gyroscope 100 is stationary. These beams are also sometimes referred to by other names, such as laser fields, light fields, or laser beams. Light from both of the beams is tapped off through one or more of the mirrors and the light from the CW beam is interfered with light from the CCW beam to determine the frequency difference between the CW and CCW beams. To avoid confusion in the drawings, the structure for tapping and interfering the two laser beams is not shown. The tapping of the laser beams occurs pursuant to established procedures. In other embodiments, different amounts of electrodes or other methods and medium exciters are used to excite the gain medium in the cavity 102. For example, in some embodiments optical pumping is used to excite a crystalline solid gain medium. Components and methods used for optical pumping are known to one having skill in the art.

In addition to the gain medium 110, an absorption medium 120 is also present in the cavity 102. Absorption medium 120 in the gyroscope 100 is composed of a neon gas and has a length L9. The absorption medium 120 is devoid of atoms that could excite the neon atoms, such as but not limited to helium atoms. A discharge current is applied across the length L9. The discharge current is induced using electrode 122 and electrode 124 powered by a power source 126. The power source 126 applies the discharge current between electrode 122 and electrode 124. In one non-limiting exemplary embodiment, electrode 122 is a cathode and electrode 124 is an anode. In other embodiments, different amounts of either cathodes, anodes, or both are included. While a neon gas is described in this embodiment, other gases, such as iodine gas, can be used as the absorption medium 120 in other embodiments. In embodiments where other gases are used as the absorption medium 120, the absorption medium 120 is devoid of atoms that could excite the atoms composing the absorption medium 120. In some example embodiments, such as gyroscope 100 shown in FIG. 1, power source 126 is distinct from power source 118. In other embodiments, greater or fewer power sources are implemented. In other example embodiments, such as embodiments utilizing iodine as an absorption medium, no discharge current is necessary and electrode 122, electrode 124, and power source 126 are omitted.

The gain medium 110 and the absorption medium 120 are separated into two separate cells so that the neon atoms in the absorption medium 120 cannot be excited by the helium atoms in the gain medium 110, while the neon atoms in the gain medium 110 are still excited by the helium atoms in the gain medium 110. In example gyroscope 100, the two separate cells are created by placing glass dividers into the cavity 102 of the gyroscope 100. Specifically, glass dividers can be placed on each side of the absorption medium 120 to isolate it from the rest of the cavity. Thus, the gain medium 110 includes both helium and neon atoms, while the absorption medium 120 includes only neon atoms and is substantially devoid of helium atoms.

In example embodiments, dividers are also placed on each side of the gain medium 110. In some embodiments, the cavity 102 is partitioned such that there is a first cell containing the gain medium 110, a second cell containing the absorption medium 120, and the remaining space in the cavity 102 creates a third cell containing a vacuum. In other example embodiments, the third cell can be filed with other gases or materials. In some example embodiments, the cells are created using other types of dividers or in other ways. Thus, by using two separate cells to contain the gain medium 110 and the absorption medium 120 allows neon to be used both as part of the gain medium and the absorption medium.

Because the neon atoms of the absorption medium 120 are separated from the helium atoms of the gain medium 110, excited helium atoms cannot interact with, and consequently excite, the neon atoms of the absorption medium 120. As discussed above, the absorption medium 120 is substantially devoid of helium gas/atoms. Thus, the separated neon atoms of the absorption medium 120 act to absorb portions of the CW and CCW beams at a range of frequencies based on the linewidth of the neon atoms. Because neon atoms in the absorption medium 120 generally have the same linewidth as the neon atoms in the gain medium 110 at the same temperature and pressure, the absorption medium 120 generally attenuates the gain profile of the gain medium across the entire linewidth of the gain medium if both the gain medium 110 and the absorption medium 120 have the same linewidth. Thus, when the gain medium 110 and the absorption medium 120 both include the same isotope of neon atoms at the same temperature and pressure with few other gases present in the cavity 102, there is no dual peak and trough gain profile created. However, when the absorption medium 120 has a narrower linewidth relative to the linewidth of the gain medium 110, a dual peak and trough gain profile is created. One exemplary technique to reduce the linewidth of the absorption medium 120 relative to the gain medium 110 is to change environmental variables, such as the temperature and/or pressure of either the gain medium 110 or the absorption medium 120.

In the example gyroscope 100, differential heating is implemented by using at least one heating element 128 to raise the temperature of the gain medium 110 to broaden the linewidth of the gain medium 110 compared to the linewidth of the absorption medium 120. In the example gyroscope 100, the at least one heating element 128 includes a first resistance wire wrapped around a portion of the cavity 102 containing the gain medium 110 in a first direction and a second resistance wire wrapped around the same portion of the cavity 102 in a second direction. The first and second resistance wires are attached to power source 118 to heat the gain medium 110 relative to the absorption medium 120 that does not have any resistive wire wrapped around it.

The first and second resistance wires are wrapped in two different directions in order to cancel out any magnetic fields caused by the coils wrapped around the cavity 102. In other embodiments, other types of heating elements are used, such as a single resistive heating element, a convection heating element, or a current source. In yet other embodiments, cooling elements are used to lower the temperature of the absorption medium 120, such as thermo-electric coolers. In other example embodiments, the pressure is varied in the first and second cells so that the absorption medium 120 has a narrower linewidth than the linewidth of the gain medium 110. In such embodiments, known techniques for adjusting pressure are implemented to vary the pressure in the first and second cells.

Figure 2:
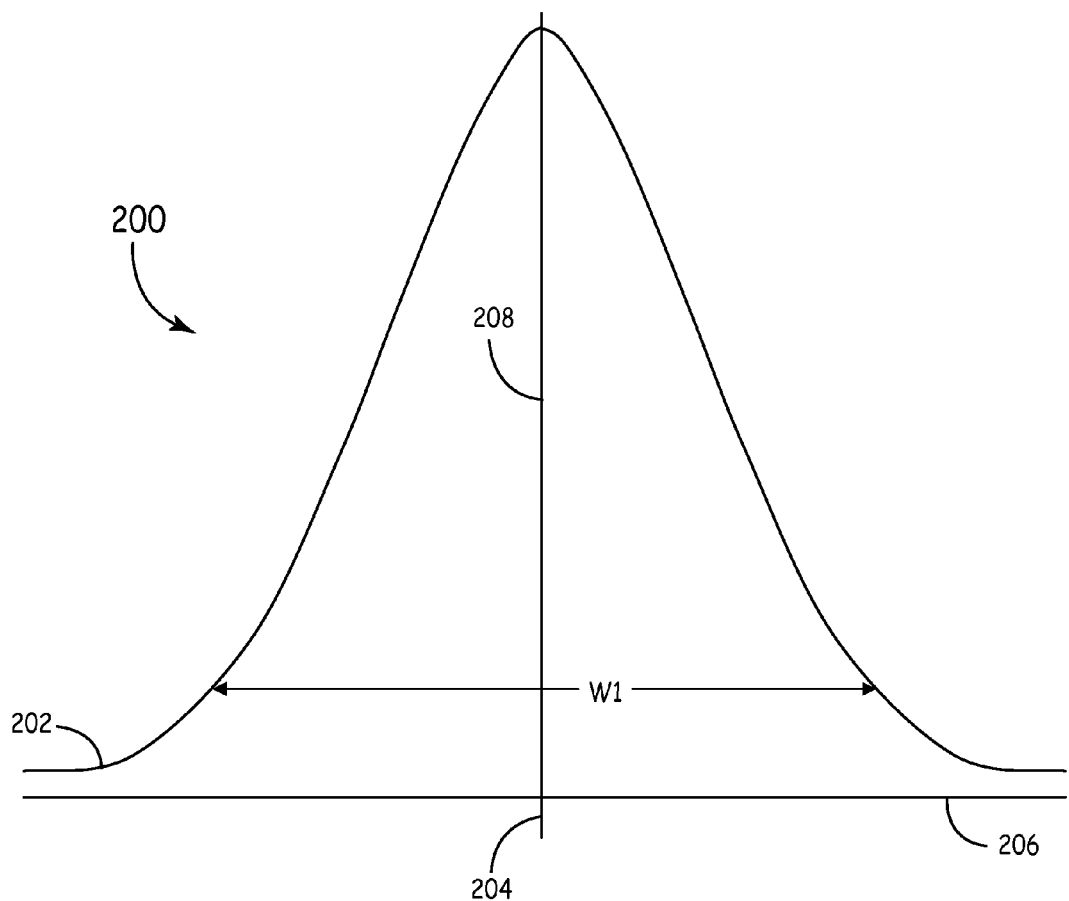
FIG. 2 shows a graph of a gain profile of a gain medium of an example embodiment of a fast light ring laser gyroscope having an enhanced scale factor.

FIG. 2 shows an exemplary graph 200 of the gain profile 202 of the gain medium 110. The gain profile 202 is plotted on the graph 200 as amplitude (Y axis 204) as a function of frequency (X axis 206). When the gyroscope is not rotating, the gain profile 202 has a gain center frequency 208. The graph 200 is centered at the gain center frequency 208. Thus, the gain center frequency 208 is on the Y axis 204 and at the center of the gain profile 202. The gain medium 110 has a first linewidth W1.

Figure 3:
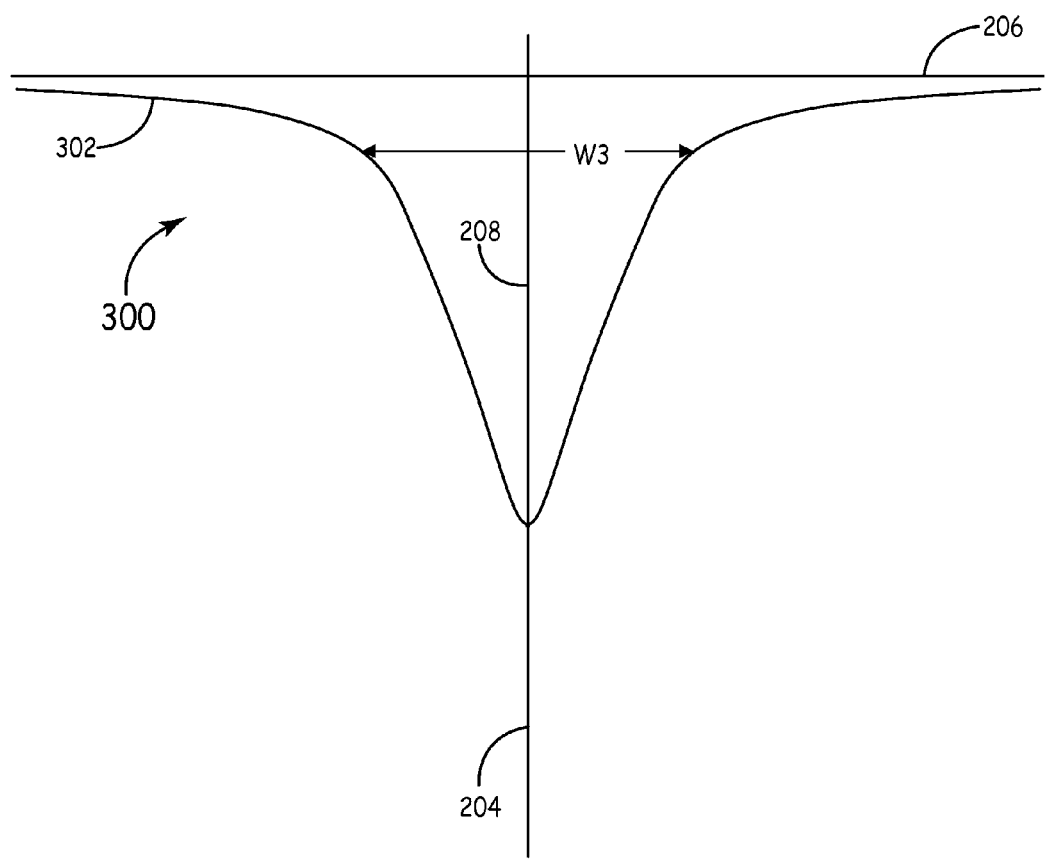
FIG. 3 shows a graph of a gain profile of an absorption medium of an example embodiment of a fast light ring laser gyroscope having an enhanced scale factor.

FIG. 3 shows an exemplary graph 300 of the gain profile 302 of the absorption medium 120. The gain profile 302 is plotted on the graph 300 as amplitude (Y axis 204) as a function of frequency (X axis 206). The absorption medium 120 has a second linewidth W3 that is narrower than the first linewidth W1 of the gain medium. As described above, the absorption medium 120 is a neon gas that fills the second cell. In example embodiments, the absorption medium 120 has a narrower linewidth due to a temperature or pressure differential between the first cell and the second cell induced as described above.

Figure 4:
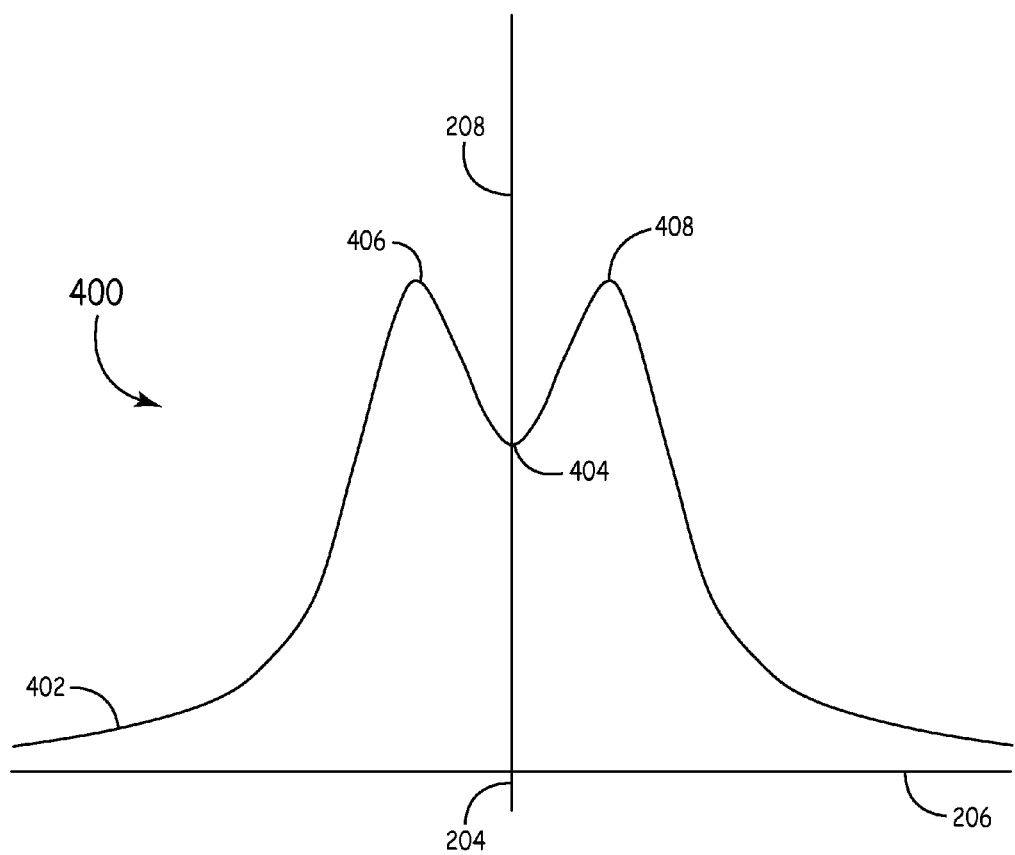
FIG. 4 shows a graph of a gain profile of an example embodiment of a fast light ring laser gyroscope having an enhanced scale factor, combining a gain profile of a gain medium with a gain profile of an absorption medium.

FIG. 4 shows an exemplary graph 400 of the overall gain profile 402 of the gyroscope 100. The overall gain profile 402 is plotted on the graph 400 as amplitude (Y axis 204) as a function of frequency (X axis 206). The overall gain profile 402 of the gyroscope 100 combines the gain profile 202 of the gain medium 110 with the gain profile 302 of the absorption medium 120. Because the gain profile 302 of the absorption medium 120 (composed of neon atoms and substantially devoid of helium atoms) is centered at a frequency near the center of the gain profile 202 of the gain medium 110 (composed of both helium and neon atoms at a higher temperature and/or pressure relative to the neon atoms of the absorption medium 120) and because the gain profile 302 of the absorption medium 120 has a narrower linewidth than the gain profile 202 of the gain medium 110, the absorption from the absorption medium 120 causes a dip (hole) near the center of the gain profile 202 of the gain medium 110.

This results in an overall gain profile 402 for the gyroscope that has two peaks and a trough as described in further detail below. The gain center frequency 208 is in a trough 404 between a first peak at a first frequency 406 and a second peak at a second frequency 408. The dual peak nature of the overall gain profile 402 is created by the reduction in gain from the gain medium 110 caused by the absorption medium 120. Anomalous dispersion is exhibited in the trough between the two peaks where the index of refraction has a negative slope. This is also described in further detail below.

The overall gain profile 402, combining the gain profile 202 of the gain medium 110 filling the cavity 102 between mirror 104 and mirror 106 for length L7 and the gain profile 302 of the absorption medium 120 filing the cavity 102, has an index of refraction of $n(\omega)$. The index of refraction $n(\omega)$ for the overall gain profile 402 is given by the following equation:

$$n(\omega) = 1 + \frac{c}{\pi} \int_0^\infty \frac{\alpha(\omega')}{\omega'^2 - \omega^2} d\omega', \qquad \text{(eq. 1)}$$

where $\omega$ is the frequency, c is the speed of light, and $\alpha$ is the gain. When the slope of the index of refraction $n(\omega)$ is negative, the desired phase shift can be induced to increase the scale factor. The slope of the index of refraction $n(\omega)$ can be found by taking the derivative of the index of refraction $n(\omega)$. Thus, in this embodiment, the gyroscope 100 is configured to operate in a range of frequencies where the slope of the index of refraction $n(\omega)$ is negative.

Because of the dual peaks on each side of the trough 404 found at the gain center frequency 208, the slope of the index of refraction $n(\omega)$ is negative near the center of the overall gain profile 402 at the gain center frequency 208. As noted above, when the slope of the index of refraction $n(\omega)$ is negative, the desired phase shift in the laser light traveling in cavity 102 can be induced to increase the scale factor. The linewidth between the two peaks can be adjusted by changing temperature and/or pressure differential between the gain medium 110 and the absorption medium 120 or by adjusting the gain medium 110 and/or the absorption medium 120 to include other atoms instead of, or in addition to, the helium and neon atoms.

In particular, although the exemplary embodiment described above uses HeNe gas as the gain medium 110 and neon gas as the absorption medium 120, it is to be understood that other materials can be used for the gain medium 110 and/or the absorption medium 120 in other embodiments. In particular, the gain medium 110 and the absorption medium 120 are chosen such that the gain medium 110 and the absorption medium 120 have similar center frequencies. Additionally, the absorption medium 120 and the gain medium 110 are chosen such that the absorption medium 120 has, or can be modified to have, a narrower linewidth than the gain medium 110, as discussed above. In addition, as discussed in further detail below, if the gain medium 110 and the absorption medium 120 will be mixed in the cavity, the gain medium 110 and the absorption medium 120 are chosen such that the absorption medium 120 is not excitable by any elements in the gain medium 110.

Figure 5:
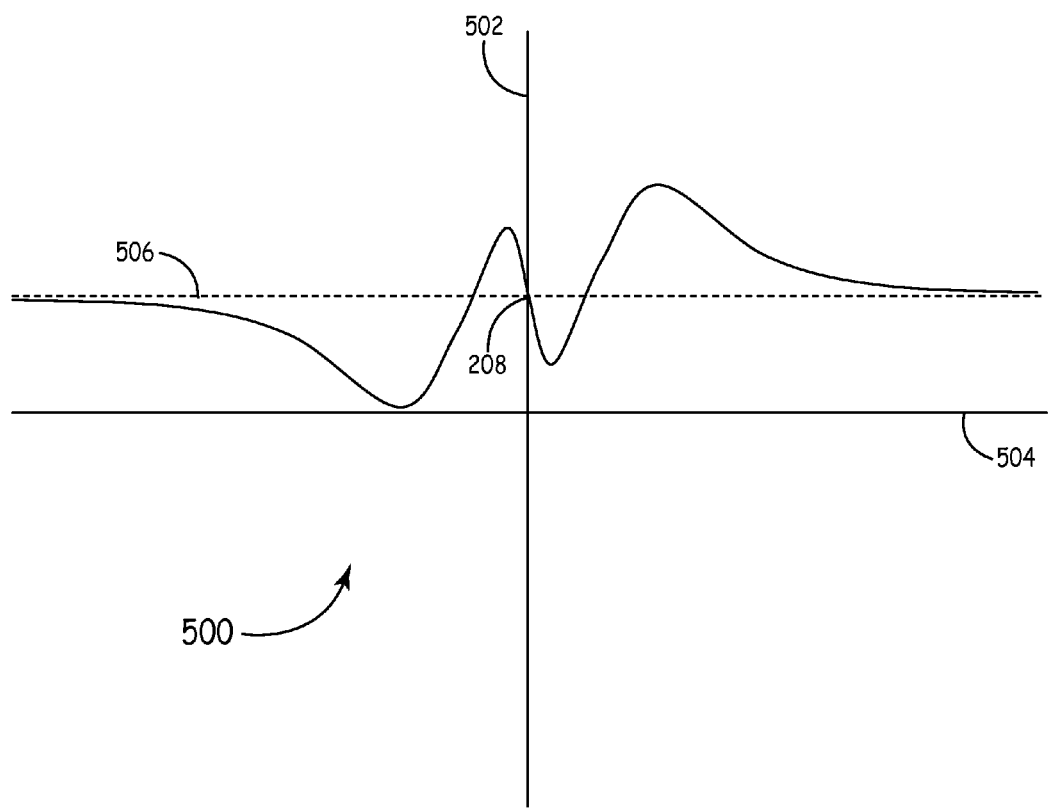
FIG. 5 shows a graph of an index of refraction of an example embodiment of a fast light ring laser gyroscope having an enhanced scale factor.

FIG. 5 shows an exemplary graph 500 of the index of refraction of the gyroscope 100. The graph 500 plots the amplitude of the index of refraction (Y axis 502) as a function of frequency (X axis 504). The graph 500 is also centered horizontally at the gain center frequency 208, so that the gain center frequency 208 is on the Y axis. The graph 500 is further centered vertically about line 506 at y=1. The index of refraction has a negative slope at and surrounding the gain center frequency 208. Thus, the example gyroscope 100 operates at the gain center frequency 208, where the slope of the index of refraction n(ω) of the gyroscope 100 is negative. It should also be noted that there are a range of available frequencies on both sides of the Y axis 502 where the index of refraction n(ω) has a negative slope.

Because the gyroscope 100 operates at the gain center frequency 208, where the gyroscope 100 has a negative slope of index of refraction n(ω) based on the overall gain profile 402, the dispersion caused by the gyroscope 100 at the gain center frequency 208 is anomalous dispersion. Anomalous dispersion is present when the index of refraction increases with increasing wavelength. If the slope of the index of refraction n(ω) was positive, the dispersion would be normal dispersion. Normal dispersion occurs when the index of refraction decreases with increasing wavelength. Because the combination of the gain medium 110 and the absorption medium 120 causes anomalous dispersion at the gain center frequency 208, it enables the total round trip optical phase in the cavity 102 to vary less as a function of optical frequency than it would in free space to the first order. In some example embodiments, the total round trip optical phase in the cavity 102 does not vary at all with optical frequency to the first order. As a result of the rotation, the effective length of the cavity 102 changes so that the resonant frequency in the stationary cavity no longer experiences a phase shift of two pi. In addition, neighboring frequencies also experience non-resonant round trip phase.

Since the phase varies more slowly with frequency than in free space, the resonant frequencies will differ from the gain center frequency 208 by a greater amount. The factor by which the frequency shifts with rotation rate is thus enhanced. This factor is known as the scale factor because it is generally proportional to the size of the device. The length L7 of the gain medium 110 relative to the length L9 of the absorption medium 120, in addition to the types of atoms included in the gain medium 110 and the absorption medium 120 are adjusted to achieve the desired scale factor.

The index of refraction n(ω) is associated with the phase profile according to the following equation:

$$\phi_{round-trip} = \frac{(L_{gyro} - l_1 - l_2)\omega}{c} + \frac{n_1(\omega)l_1\omega}{c} + \frac{n_2(\omega)l_2\omega}{c}, \quad (eq.\ 2)$$

where $\phi_{round-trip}$ is the phase shift due to a single pass through the gain medium 110 and the absorption medium 120, c is the speed of light, ω is the frequency of the light, $n_1$ is the index of refraction of the gain medium 110, $n_2$ is the index of refraction of the absorption medium 120, $l_1$ is the length light travels through the gain medium 110 during one loop through the cavity 102 of the gyroscope 100 while stationary (L7), $l_2$ is the length light travels through the absorption medium 120 during one loop through the cavity 102 of the gyroscope 100 while stationary (L9), and $L_{gyro}$ is the total length light travels during one loop through the cavity 102 of the gyroscope 100 while stationary (the length of the entire cavity).

The expression for the index of refraction n(ω) of the gain medium 110 given in equation 1 can be used to determine a gain center frequency 208 that exhibits the necessary scale factor enhancement. Equation 3 below indicates the conditions on index of refraction for which scale factor is enhanced, but neither the degree of enhancement nor the dynamic range over which the enhancement operates is constant. Enhancement of the scale factor generally occurs for index slopes between zero and the negative value given by the right side of equation 3. The degree of enhancement is zero for a slope of zero. The degree of enhancement increases as the slope of the index approaches the value given by the right side of equation 3. The scale factor enhancement and the dynamic range over which the enhancement operates are inversely related. As the scale factor enhancement approaches infinity, the dynamic range approaches zero. The scale factor enhancement approaches infinity when the index slope approaches the negative value given by the right side of equation 3.

Equation 3 is:

$$0 \geq \frac{dn_1}{d\omega}\bigg|_{\omega_0} \geq -\frac{L_{gyro}}{l_1\omega_0} - \frac{\frac{dn_2}{d\omega}\big|_{\omega_0} l_2}{l_1}, \quad (eq.\ 3)$$

where ω is the frequency, $n_1$ is the index of refraction of the saturated gain medium 110, $\omega_0$ is the gain center frequency 208, $n_1$ is the index of refraction of the gain medium 110, $n_2$ is the index of refraction of the absorption medium 120, $l_1$ is the length light travels through the gain medium 110 during one loop through the cavity 102 of the gyroscope 100 while stationary, $l_2$ is the length light travels through the absorption medium 120 during one loop through the cavity 102 of the gyroscope 100 while stationary, and $L_{gyro}$ is the total length light travels during one loop through the cavity 102 of the gyroscope 100 while stationary.

Figure 6:
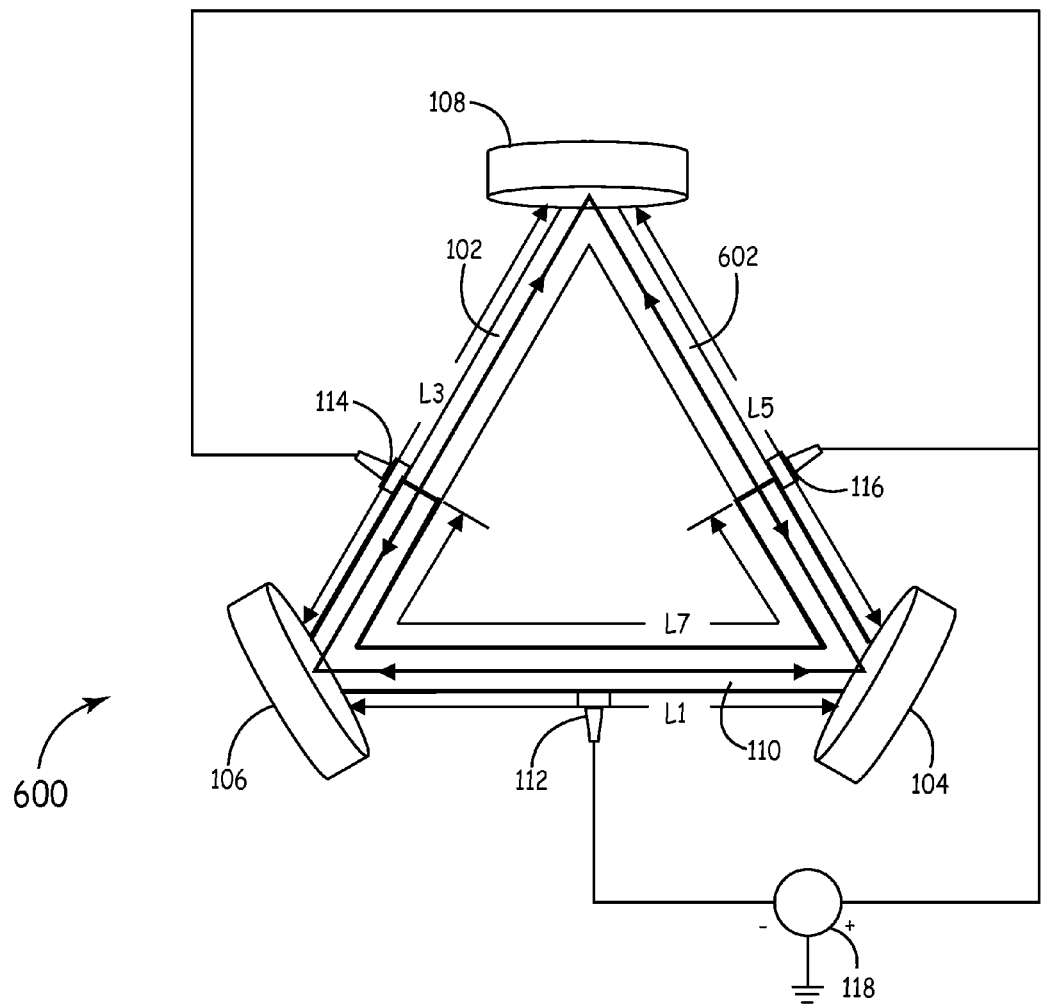
FIG. 6 is a block diagram depicting another exemplary embodiment of a fast light ring laser gyroscope having an enhanced scale factor.

FIG. 6 is a block diagram depicting another exemplary fast light ring laser gyroscope 600 having an enhanced scale factor. As with gyroscope 100, the gyroscope 600 includes the interior cavity 102 filed with a HeNe gas, the first mirror 104, the second mirror 106, the third mirror 108, the gain medium 110, the electrode 112, the electrode 114, the electrode 116, and the power source 118. The gain medium 110 in gyroscope 600 fills all of the cavity 102 between mirror 104 and mirror 106 in addition to portions of the cavity 102 between mirror 106 and mirror 108 and portions of the cavity 102 between mirror 104 and mirror 108. The total length of the gain medium 110 in gyroscope 600 is L7. While length L7 spans the entire length L1 and portions of length L3 and L5 in the example embodiment, it can be shorter or longer in other embodiments. Electrode 112, electrode 114, and electrode 116 are positioned so that the current induced spans the desired length of the cavity. In other embodiments, smaller or larger portions of HeNe gas in the cavity 102 are converted into a gain medium 110 by inducing a current across other lengths. While the description above focuses on gyroscope 600, it applies to various lengths of gain medium 110 filling various portions of the interior cavity 102.

Gyroscope 600 differs from gyroscope 100 in that gyroscope 600 includes absorption medium 602 instead of absorption medium 120. Absorption medium 602 fills the entire cavity 102 in this embodiment. Similar to absorption medium 120 above, absorption medium 602 is selected for a particular gain medium 110 in order to have the characteristics described above concerning relative gain center frequencies and linewidth of the gain medium 110 and the absorption medium 602. In addition, since the absorption medium 602 is mixed with the gain medium 110 in portions of the cavity 102, the absorption medium 602 is chosen such that it is not significantly excitable by any elements in the gain medium 110. In this exemplary embodiment, iodine gas is chosen as the absorption medium 602 and HeNe gas is chosen as the gain medium 110. Iodine gas as the absorption medium 602 in combination with HeNe gas as the gain medium 110 have the desired characteristics as described in detail below.

When the current is applied to the helium atoms in the gain medium 110, the helium atoms are excited. When the excited helium atoms bump into the neon atoms, the neon atoms are excited, resulting in gain. In contrast, the natural absorption of the iodine atoms can be used to absorb portions of the CW and CCW beams. Thus, the iodine atoms constitute an absorption medium. As discussed in further detail below, the absorption medium created with iodine atoms absorbs portions of the CW and CCW beams at a range of frequencies based on the linewidth of the iodine atoms.

As discussed above, the iodine atoms are interspersed with the helium and the neon atoms in the cavity 102. Iodine and neon have absorption profiles that are very close in frequency. Thus, iodine will absorb the laser light at the frequencies emitted from a HeNe laser. Iodine can be mixed together with the HeNe gas without affecting the absorption properties of the iodine and the gain properties of the HeNe gas. The linewidth of iodine is narrower than the linewidth of neon because iodine is a larger, heavier atom and the Maxwell Boltzmann distribution for iodine thus has a narrower range of velocities than that of neon at the same temperature.

If the linewidth of the gain medium 110 is appropriately broader than the linewidth of the absorption medium 602, then the combined gain profile for the gyroscope will have a dual peak and trough configuration similar to that shown in FIG. 4 above. When the gain profile resembles that shown in FIG. 4 above, the index of refraction of the gyroscope 600 resembles that shown in FIG. 5 above and operation near the center of the gain profile will result in the desired scale factor enhancement as described above.

Figure 7:
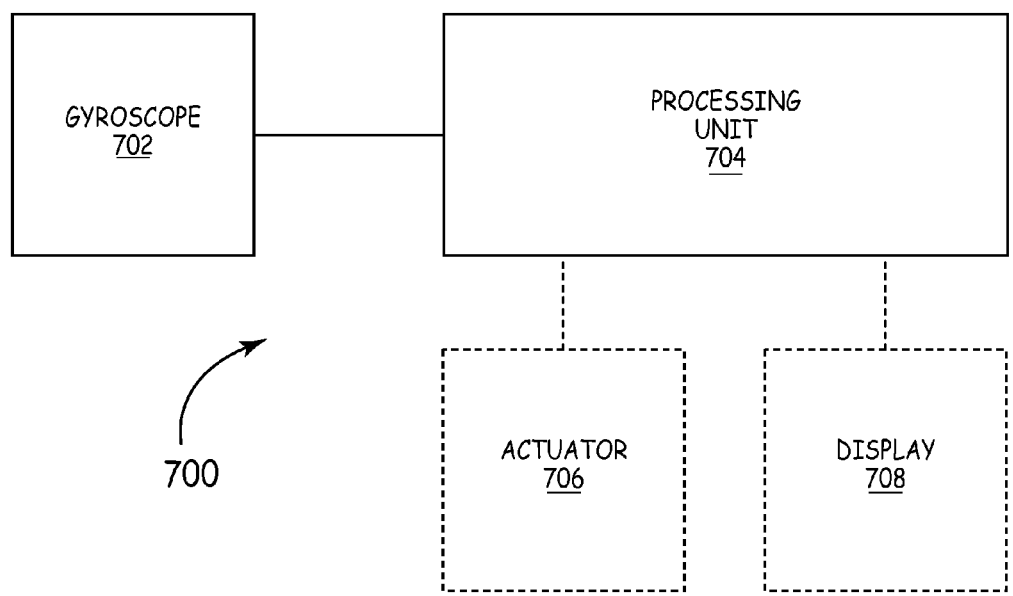
FIG. 7 is a block diagram depicting an exemplary system including a fast light ring laser gyroscope having an enhanced scale factor.

FIG. 7 is a block diagram depicting an exemplary system 700 including a fast light ring laser gyroscope having an enhanced scale factor. The system 700 includes a gyroscope 702, such as exemplary fast light ring laser gyroscope 100 described above. In addition to the gyroscope 702, the system 700 also includes a processing unit 704. The gyroscope 100 is communicatively coupled to the processing unit 704. The processing unit 704 includes a processor and memory. The processing unit 704 includes or functions with software programs, firmware or other computer readable instructions for carrying out various methods, process tasks, calculations, and control functions, used in the processing of signals from the gyroscope 702. For example, in some embodiments, system 700 is a navigation system. In these embodiments, the processing unit 704 calculates navigation parameters based on the signals from the gyroscope 702.

These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

Some embodiments of the system 700 also include at least one actuator 706 and/or at least one display 708. The actuator 706 is actuated by the processing unit 704 based on information received from the gyroscope 702. For example, in some embodiments, the processing unit 704 provides control signals, based on calculated navigation parameters, to the actuator 706 to engage a flap, aileron, elevator, or other control surface on an aircraft. It is to be understood that the implementation of actuator 706 is dependent on the implementation of system 700. The display 708 outputs information received from, or related to, the gyroscope 702. For example, the display 708 could display the rotational rate of an aircraft, vehicle, or other object.

Figure 8:
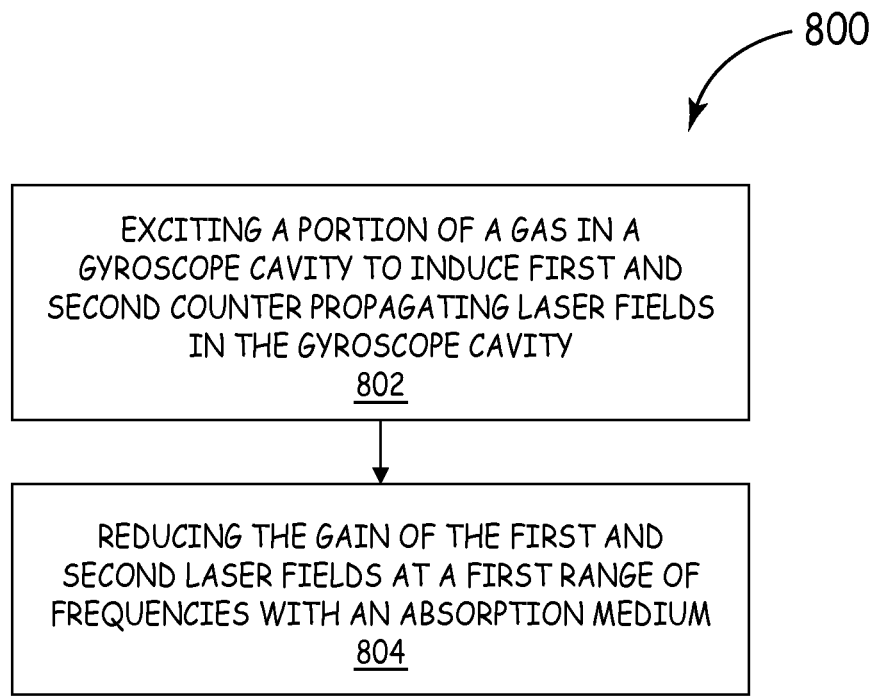
FIG. 8 is a flow chart depicting one embodiment of a method of making a fast light gyroscope having an enhanced scale factor.

FIG. 8 is a flow chart depicting one embodiment of a method 800 of increasing a scale factor of a fast light gyroscope. At block 802, a portion of a gas in a gyroscope cavity is excited to induce first and second counter propagating laser fields in the gyroscope cavity. In example embodiments, the portion of the gas is excited by a current that is applied across the portion of the gas. At block 804, the gain of the first and second laser fields is reduced at a first range of frequencies with an absorption medium. The first range of frequencies is centered at or near the center of the gain profile creating a trough between two peaks. The gyroscope is configured to operate at a gain center frequency at or near the center of the trough, where the index of refraction associated with the gain medium has a negative slope. Because the index of refraction associated with the gain medium has a negative slope at the gain center frequency, the gain medium causes anomalous dispersion of light passing through the gain medium. The anomalous dispersion of the light passing through the gain medium results in an increased scale factor for the gyroscope as described above.

Although specific embodiments have been illustrated and described herein, it will be appreciated by those of ordinary skill in the art that any arrangement, which is calculated to achieve the same purpose, may be substituted for the specific embodiments shown. For example, although the exemplary embodiments described above operate using HeNe lasers, it is to be understood that other types of lasers could also be used. In addition, although the exemplary embodiments described above include ring laser gyroscopes having cavities shaped like equilateral triangles with mirrors placed at each of the three corners of the triangle, it is to be understood that the cavities could also be other shapes and greater or fewer mirrors could be used. Therefore, it is manifestly intended that this invention be limited only by the claims and the equivalents thereof.

What is claimed is:

1. A ring laser gyroscope comprising:
   a cavity containing a gain medium having a first linewidth;
   a first plurality of reflective surfaces coupled to the cavity, the first plurality of reflective surfaces including at least a first reflective surface, a second reflective surface, and a third reflective surface, wherein the first reflective surface, the second reflective surface, and the third reflective surface of the plurality of reflective surfaces are positioned to reflect light along a path defined in the cavity between the plurality of reflective surfaces;

at least one medium exciter operable to excite the gain medium, wherein the excited gain medium induces first and second laser fields within the cavity;

wherein a portion of the cavity contains an absorption medium having a second linewidth that is narrower than the first linewidth of the gain medium; and wherein the absorption medium is configured to reduce the gain of the first and second laser fields at a first range of frequencies based on the relationship between the second linewidth and the first linewidth to achieve a gain profile for the ring laser gyroscope having two peaks separated by a trough, wherein anomalous dispersion of light occurs at frequencies within the trough.

2. The ring laser gyroscope of claim 1, wherein the gain medium and the absorption medium are mixed within a portion of the cavity.

3. The ring laser gyroscope of claim 2, wherein the gain medium includes a helium gas and a neon gas; and
wherein the absorption medium includes an iodine gas.

4. The ring laser gyroscope of claim 1, wherein the gain medium is contained within a first cell within the cavity; and
wherein the absorption medium is contained within a second cell within the cavity.

5. The ring laser gyroscope of claim 4, wherein the gain medium includes helium and neon gas;
wherein the absorption medium includes a neon gas; and
wherein the second cell is substantially devoid of helium.

6. The ring laser gyroscope of claim 4, further comprising at least one of a heating element operable to heat the first cell to a higher temperature than the second cell and a cooling element operable to cool the second cell to a lower temperature than the first cell.

7. The ring laser gyroscope of claim 1, wherein the cavity includes a first section between the first and second mirrors, a second section between the second and third mirrors, and a third section between the first and third mirrors; and
wherein the gain medium fills the entire first section and portions of the second and third sections.

8. The ring laser gyroscope of claim 1, wherein the medium exciter includes a first electrode, a second electrode, and a power source.

9. A method of increasing a scale factor in a ring laser gyroscope having a cavity, the method comprising:
exciting a gain medium in a cavity, the gain medium having a first linewidth, wherein the excited gain medium induces first and second laser fields within the cavity, the first laser field traveling in a clock-wise direction through the cavity and the second laser field traveling in a counter clock-wise direction through the cavity; and
reducing the gain of the first and second laser fields at a first range of frequencies with an absorption medium having a second linewidth based on the relationship between the second linewidth and the first linewidth to achieve a gain profile for the ring laser gyroscope having two peaks separated by a trough, wherein anomalous dispersion of light occurs at frequencies within the trough.

10. The method of claim 9, wherein the gain medium and the absorption medium are mixed within a portion of the cavity.

11. The method of claim 10, wherein the gain medium includes a helium gas and a neon gas; and
wherein the absorption medium includes an iodine gas.

12. The method of claim 9, wherein the gain medium is contained within a first cell within the cavity; and
wherein the absorption medium is contained within a second cell within the cavity.

13. The method of claim 12, wherein the gain medium includes helium and neon gas;
wherein the absorption medium includes a neon gas; and
wherein the second cell is substantially devoid of helium.

14. The method of claim 12, further comprising:
heating the first cell to a higher temperature than the second cell.

15. A system comprising:
a processing unit;
a ring laser gyroscope coupled to the processing unit, the ring laser gyroscope including:
a cavity containing a gain medium having a first linewidth;
a first plurality of reflective surfaces coupled to the cavity, the first plurality of reflective surfaces including at least a first reflective surface, a second reflective surface, and a third reflective surface, wherein the first reflective surface, the second reflective surface, and the third reflective surface of the plurality of reflective surfaces are positioned to reflect light along a path defined in the cavity between the plurality of reflective surfaces;
at least one medium exciter operable to excite the gain medium, wherein the excited gain medium induces first and second laser fields within the cavity;
wherein a portion of the cavity contains an absorption medium having a second linewidth that is narrower than the first linewidth of the gain medium; and
wherein the absorption medium is configured to reduce the gain of the first and second laser fields at a first range of frequencies based on the relationship between the second linewidth and the first linewidth to achieve a gain profile for the ring laser gyroscope having two peaks separated by a trough, wherein anomalous dispersion of light occurs at frequencies within the trough; and
wherein the processing unit is operable to process signals output from the ring laser gyroscope to calculate at least one navigation parameter.

16. The system of claim 15, wherein the gain medium and the absorption medium are mixed within a portion of the cavity.

17. The system of claim 16, wherein the gain medium includes a helium gas and a neon gas; and
wherein the absorption medium includes an iodine gas.

18. The system of claim 15, wherein the gain medium is contained within a first cell within the cavity; and
wherein the absorption medium is contained within a second cell within the cavity.

19. The system of claim $_{18}$, wherein the gain medium includes helium and neon gas;
wherein the absorption medium includes a neon gas; and
wherein the second cell is substantially devoid of helium.

20. The system of claim 18, further comprising a heating element operable to heat the first cell to a higher temperature than the second cell.

* * * * *